UNITED STATES PATENT OFFICE.

FREDRIK W. DE JAHN, OF NEW YORK, N. Y., ASSIGNOR TO GENERAL CHEMICAL COMPANY, OF NEW YORK, N. Y., A CORPORATION OF NEW YORK.

PRODUCTION OF AMMONIA.

1,141,947.  Specification of Letters Patent.  Patented June 8, 1915.

No Drawing.  Application filed August 2, 1913. Serial No. 782,628.

*To all whom it may concern:*

Be it known that I, FREDRIK W. DE JAHN, a subject of the King of Norway, and a resident of the borough of Manhattan, city, county, and State of New York, have invented certain new and useful Improvements in the Production of Ammonia, of which the following is a specification.

My invention relates to the synthetic production of ammonia and more particularly to a new catalytic agent therefor, its production and use.

I have discovered that if a gaseous mixture containing nitrogen and hydrogen is suitably passed over a material containing nickel, iron, or molybdenum and sodium or potassium and nitrogen, the nitrogen and hydrogen of the gaseous mixture are united to form ammonia.

When nickel, sodium and nitrogen are used as the catalytic agent, such agent is preferably prepared by suitably placing nickel nitrate on pumice stone, then heating the result to about 550° C., then treating it with hydrogen at about the same temperature and then treating with metallic sodium and subsequently with dry ammonia gas at a temperature of about 450° C. With a catalytic agent so prepared nitrogen and hydrogen may be caused to combine with the production of ammonia at a temperature of about 500° C. and a pressure of about 70 atmospheres.

In order that my invention may be clearly understood, it is now set forth in the form of a specific example, it being understood of course that the invention is not to be limited to the exact materials or proportions thereof nor to the other conditions of the example, since these may be varied without departing from my invention.

*Example I—Preparing the catalyzer.—* Pumice stone in small pieces is purified by treatment with hydrochloric acid in the cold for about twenty-four hours, it is then washed with distilled water until free from chlorid and then ignited to dryness. Of this product 175 grams are treated with 257 grams of crystallized nickel nitrate dissolved in the necessary quantity of water and the whole is evaporated to dryness, being stirred thoroughly during the evaporation; in this way the nickel nitrate is to be uniformly distributed over the pumice. The thus treated pumice is now ignited to about 550° C. until fumes are no longer given off and is then heated to about 550° C. in an atmosphere of hydrogen for eight hours or thereabout, i. e., until water is no longer formed. To the product when cooled 20 grams of metallic sodium are added in an indifferent atmosphere such as that of hydrogen, the material is heated for the purpose of melting the sodium and the molten metal is uniformly distributed, as by vigorous stirring, over the surfaces of the pumice material. The indifferent gas is then displaced by anhydrous ammonia vapor or gas and the material is heated to about 450° C. until a practically constant weight is obtained thereby introducing nitrogen into the catalyzer. The material after being cooled is preserved ready for use in a dry atmosphere of ammonia. The pumice stone acts as a carrier or support for the catalytic agent and may of course be replaced by any other suitable inert and heat resistant material, preferably one which is either porous or fibrous or both. Instead of the nickel nitrate specified in the example, another nickel containing material capable of yielding metallic nickel with hydrogen may be used and instead of the sodium and the subsequent treatment with ammonia, sodium amid may be used. I have further found that in the above Example I I can use ferric nitrate, or molybdenum chlorid, in place of the nickel nitrate and potassium in place of the sodium and thus obtain effective catalytic material for the production of ammonia as given in Example II herein. It is, of course, understood that the catalyzer may contain either nickel, iron, or molybdenum, together with sodium or potassium and nitrogen, or may contain two or more of these metals together with sodium or potassium and nitrogen.

*Example II—Utilizing the catalyzer to produce ammonia.—*For producing ammonia about 134 grams of the above catalyzer, or a corresponding amount of its equivalent, are placed in a suitable catalytic chamber for ammonia synthesis and there is passed in contact with such catalyzer a gas current preferably containing one volume of nitrogen for every three volumes of hydrogen. The gas mixture must be suitably purified and must be freed especially from contact poisons in the well-known manner. With the pressure of the gas traversing the chamber within the range of 80 to 90 atmospheres and the temperature of treatment approximately between 520° C. and 540° C., I have succeeded in producing synthetic ammonia to the extent that the ammonia gas leaving the treating chamber constituted 4.5% by volume of the total gas leaving said chamber. The ammonia is removed from the gas discharged from the catalytic chamber in any suitable manner.

I have found that iron and molybdenum are the equivalents of nickel for the purposes of this invention.

I claim:

1. The process of producing ammonia which comprises passing a mixture containing nitrogen and hydrogen over a catalytic agent containing nickel, sodium and nitrogen.

2. The process of producing ammonia which comprises passing a mixture containing nitrogen and hydrogen over a heated catalytic agent containing nickel, sodium and nitrogen.

3. The process of producing ammonia which comprises passing a mixture containing nitrogen and hydrogen under pressure over a heated catalytic agent containing nickel, sodium and nitrogen.

4. The process of making ammonia which comprises passing a mixture containing nitrogen and hydrogen under a pressure less than 100 atmospheres over a heated catalytic agent containing nickel, sodium and nitrogen.

In testimony whereof I have hereunto set my hand in the presence of two subscribing witnesses.

FREDRIK W. DE JAHN.

Witnesses:
J. B. F. HERRESHOFF,
BERNHARD C. HESSE.